(12) United States Patent
Coe

(10) Patent No.: US 6,199,800 B1
(45) Date of Patent: Mar. 13, 2001

(54) DEPLOYMENT DEVICE FOR PARACHUTES

(75) Inventor: Bill J. Coe, Deland, FL (US)

(73) Assignee: PD of Miami, Inc., Deland, FL (US)

( * ) Notice: Subject to any disclaimer, the term of this patent is extended or adjusted under 35 U.S.C. 154(b) by 0 days.

(21) Appl. No.: 09/316,417

(22) Filed: May 21, 1999

(51) Int. Cl.[7] .................................................. B64D 17/00
(52) U.S. Cl. ........................ 244/142; 244/147; 244/149; 244/150
(58) Field of Search .................................... 244/149, 142, 244/147, 150

(56) References Cited

U.S. PATENT DOCUMENTS 3,281,098 * 10/1966 Stencel et al. ....................... 244/149
3,291,423 * 12/1966 Britton, Jr. .......................... 244/149
5,722,619 * 3/1998 Cottle ................................. 244/149

* cited by examiner

Primary Examiner—J. Woodrow Eldred
(74) Attorney, Agent, or Firm—Malin, Haley & DiMaggio, P.A.

(57) ABSTRACT

Disclosed is a low-drag/high-speed pilot chute which is attached to a bridle cord, and a high-drag/low-speed pilot chute which is attached with a weak link to the bridle cord. In a low-speed deployment scenario, the high-drag pilot chute provides enough drag to deploy the canopy quickly. However, if the deployment speed is high enough, the force from the high-drag pilot chute will exceed the strength of the weak link and break it. This separates the high-drag pilot chute from the rest of the assembly. The low-drag/high-speed pilot chute then continues deploying the parachute, effectively protecting the parachute and its cargo from the ill effects of having too much pilot chute force.

15 Claims, 4 Drawing Sheets

DEPLOYMENT DEVICE FOR PARACHUTES

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates generally to deployment devices for parachutes and particularly to a device which can be used at both low and high deployment speeds.

2. Description of Related Art

Parachutes are commonly packed in a bag or sleeve which is attached to a first end of a bridle cord. A pilot chute is attached to a second end of the bridle cord. The parachute lines are stowed on or in this bag or sleeve in such a way that the lines must be fully extended before the parachute may come out of the bag. The entire system just described is then packed into its container. The pilot chute is deployed manually or by the action of a spring built into the pilot chute itself, with the container being opened in the process. The pilot chute creates drag from the airflow, which in turn lifts the bag or sleeve out of the container, extending the lines in the process. Once the lines are extended, the bag or sleeve is opened and the parachute is released into the airflow and inflates.

If a parachute is designed to deploy quickly at low airspeeds, the pilot chute must be of a high-drag variety, in order to develop enough force to extract the bag from the container quickly, extend the parachute lines, and release the canopy so that it can then inflate. If the pilot chute does not create enough drag at low speeds, then the parachute may not deploy. If this low speed parachute system is then deployed at higher speeds, the high drag pilot chute will develop too much force, which may cause deployment system damage, canopy damage, or a malfunction of the parachute due to an out-of-sequence deployment.

If a parachute is designed to deploy at high speeds, a smaller, low-drag pilot chute is used to keep the drag down to an appropriate level and maintain order in the deployment sequence. However, the small, low-drag pilot chute of this high-speed system will not have enough drag to reliably deploy the parachute at low speeds.

Therefore, deployment systems are usually a compromise between having enough drag at low speeds to deploy the parachute, but not so much drag at high speeds that it creates the problems described above. This compromise limits the speed range of the typical parachute system. It is therefore to these shortcomings to which the present invention is directed.

BRIEF SUMMARY OF THE INVENTION

The present invention effectively eliminates the above described compromise of deployment speed range by incorporating a high-drag pilot chute which is effective at low speeds, but which, in a preferred embodiment, detaches itself if the drag exceeds a predetermined value. Upon detachment, a low-drag pilot chute takes over which allows safe deployment at a higher speed than would otherwise have been possible. With this system, there is no need to compromise in the drag characteristics of the pilot chute because the system selects the correct pilot chute for the airspeed the parachute is being deployed at. As stated above, in the preferred embodiment, the low-drag pilot chute can be packed in a pouch and deployed automatically when needed. Alternatively, the low-drag pilot chute can be deployed in conjunction with a high-drag pilot chute, assisting in a low-speed situation. In either embodiment, a parachute system can be safely used at wider speed range than was possible before.

The invention uses a low-drag/high-speed pilot chute which is attached to the bridle cord, and a high-drag/low-speed pilot chute which is attached with a weak link to the bridle cord. In a lowspeed deployment scenario, the high-drag pilot chute provides enough drag to deploy the canopy quickly. However, if the deployment speed is high enough, the force from the high-drag pilot chute will exceed the strength of the weak link and break it. This separates the high-drag pilot chute from the rest of the assembly. The low-drag/high-speed pilot chute then continues deploying the parachute, effectively protecting the parachute and its cargo from the ill effects of having too much pilot chute force.

It is an object of the present invention to effectively solve a common problem inherent in parachutes intended for deployment at both low and high deployment speeds.

In accordance with these and other objects which will become apparent hereinafter, the instant invention will now be described with particular reference to the accompanying drawings.

DETAILED DESCRIPTION OF THE INVENTION

Figure 1:
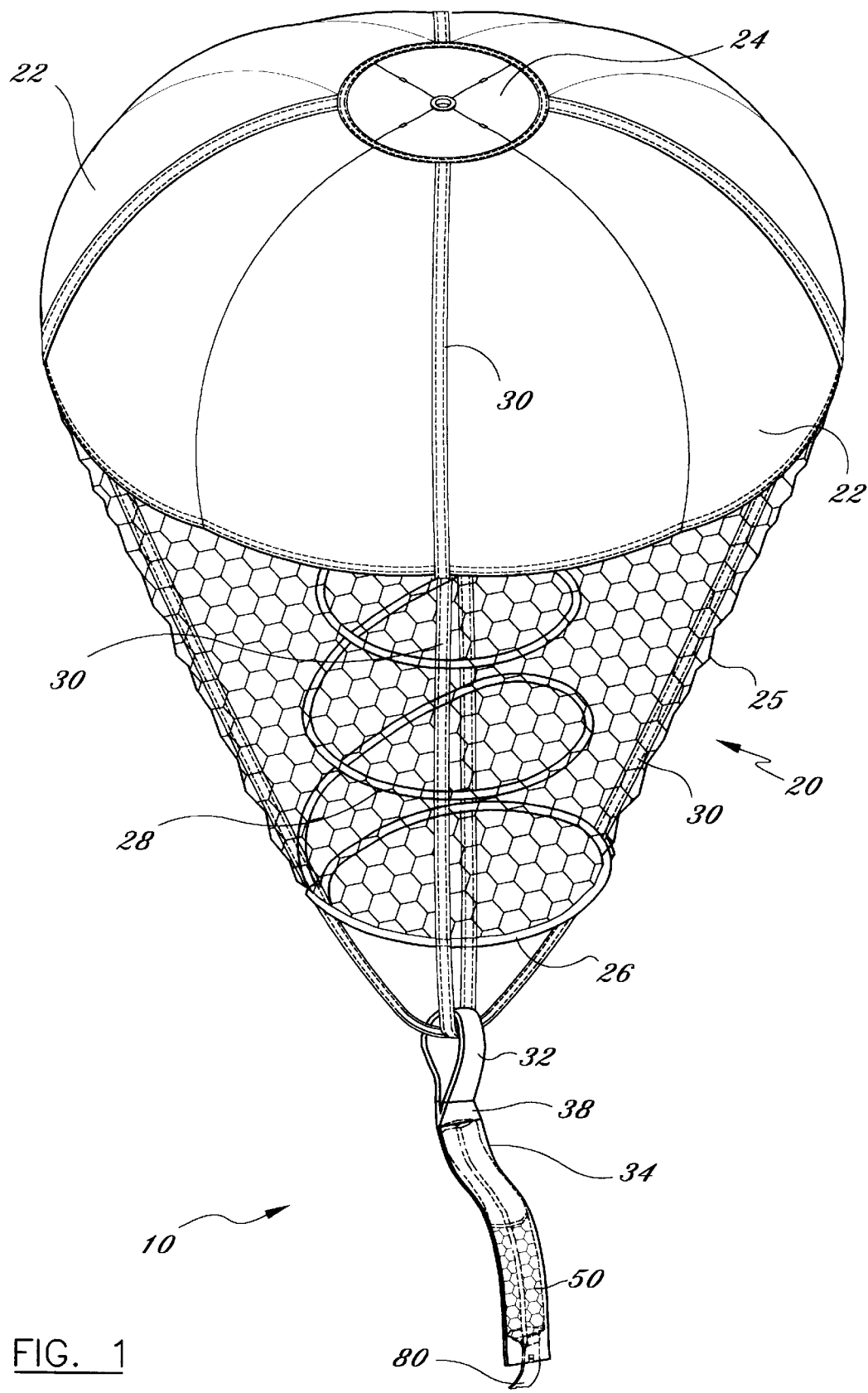
FIG. 1 is a perspective view of a first embodiment of the present invention illustrating the low-speed/high-drag pilot chute deployed, and the high-speed/low-drag pilot chute shown in its packed position.

As seen in the drawings the present invention provides a pilot chute assembly 10 for a conventional canopy (not shown). Pilot chute assembly 10 generally incorporates a low speed/high drag pilot chute 20 and a high speed/low drag pilot chute 50.

Low speed pilot chute 20 includes gores 22 conventionally attached at their top ends to a center crown 24. The lower ends of gores 22 are conventionally attached to the top end of a mesh fabric body 25. A lower end of mesh fabric body 25 are attached to a fabric pocket 25 which house the first end of a spring member 28. The second end of spring member is connected to crown 24. Suspension lines 30 run from a top end to crown 24 and are attached to gores 22, mesh fabric body 25 and fabric pocket 26 by conventional means, including, but not limited to, stitching.

The various components and attachment methods described in the preceding paragraph are conventional and illustrate a preferred embodiment for pilot chute 20. However, it should be understood that other conventional spring and springless low speed/high drag pilot chutes, known to those skilled in the art, can be substituted for pilot chute 20 and are considered within the scope of the invention.

Figure 2:
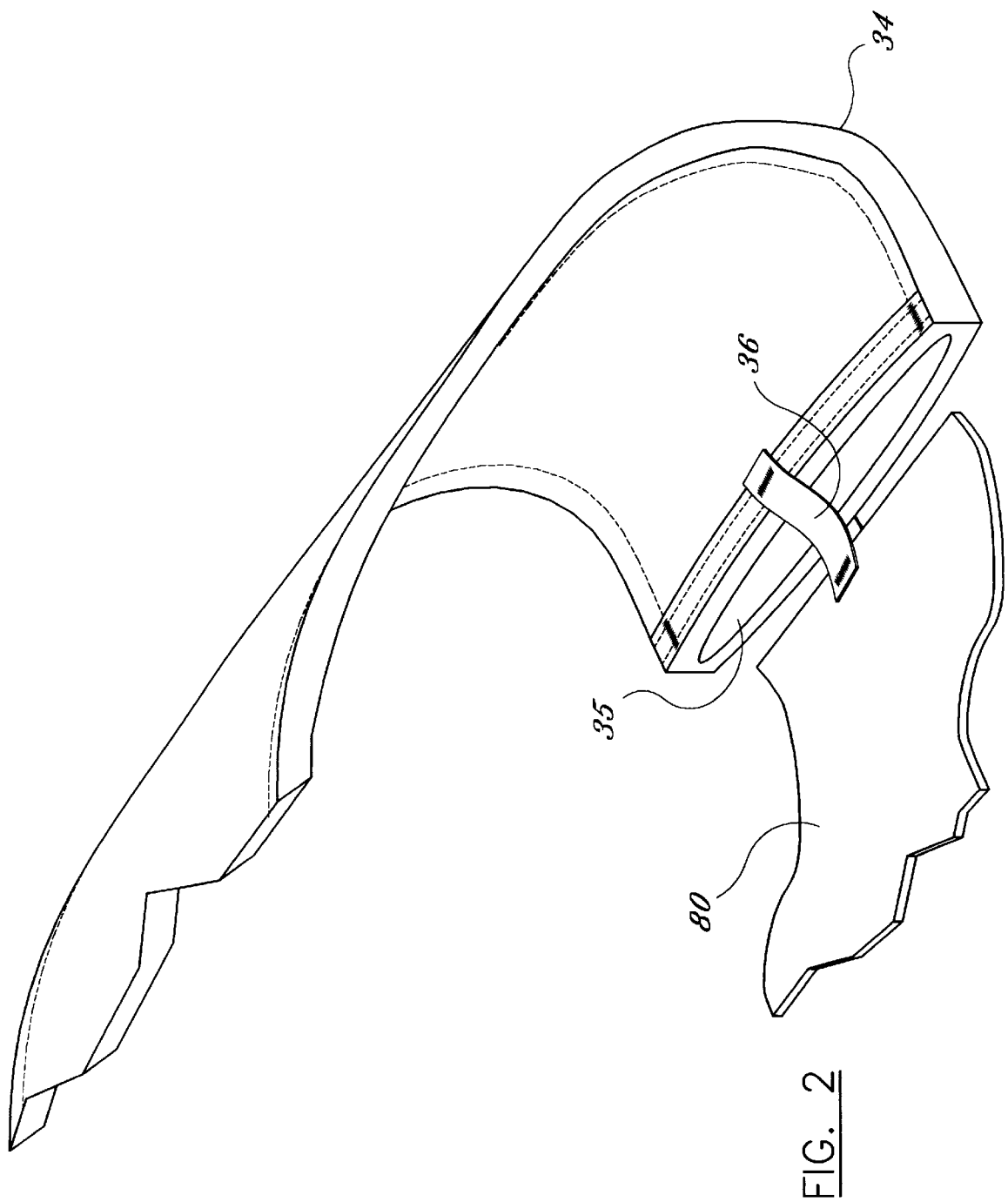
FIG. 2 is a perspective view of the weak link attachment of the weak link used for attaching the low-speed/high-drag pilot to the bridle cord.
Figure 3:
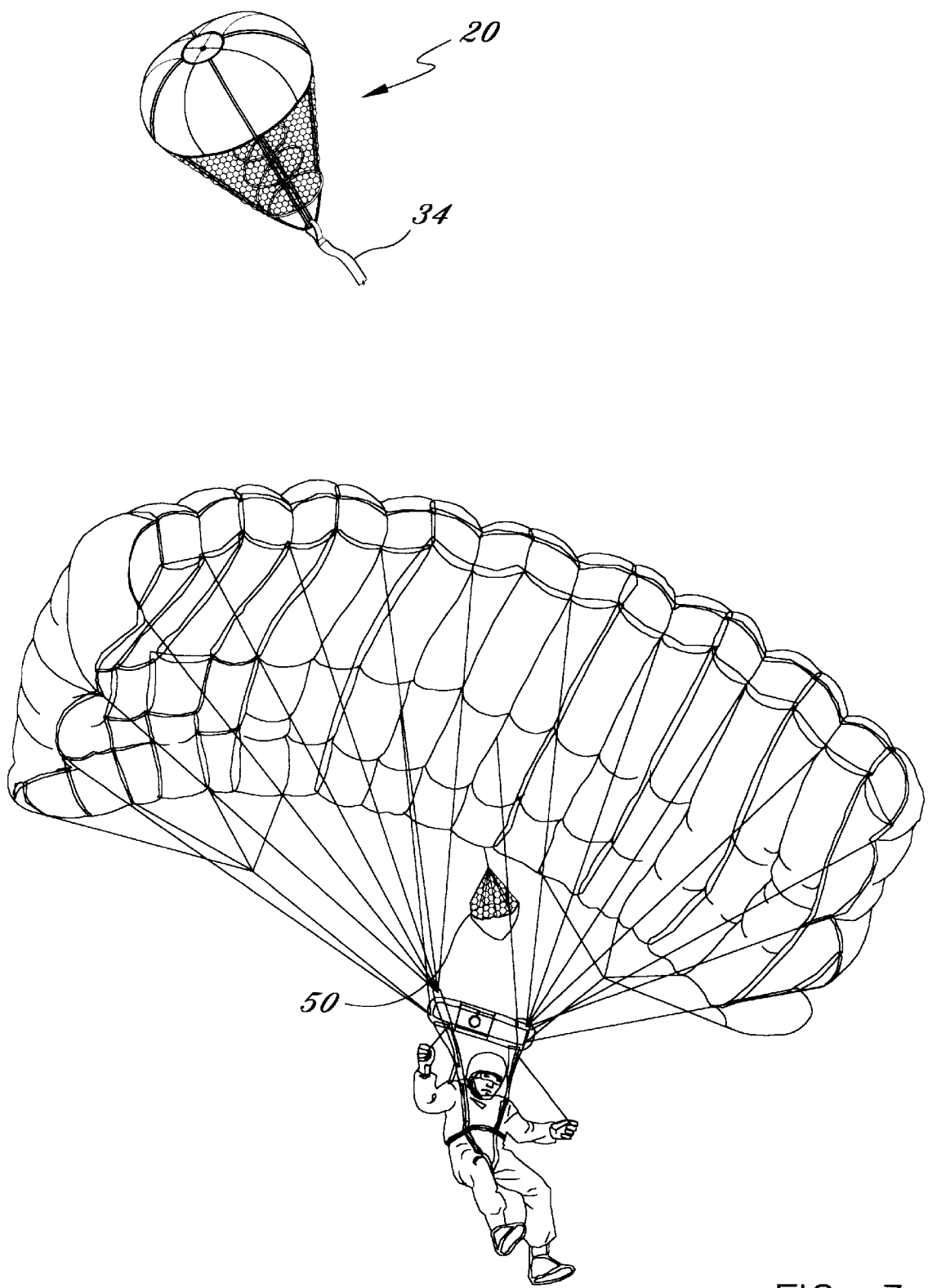
FIG. 3 is a perspective view illustrating the parachute fully deployed, with the low-speed/high-drag pilot detached.
Figure 4:
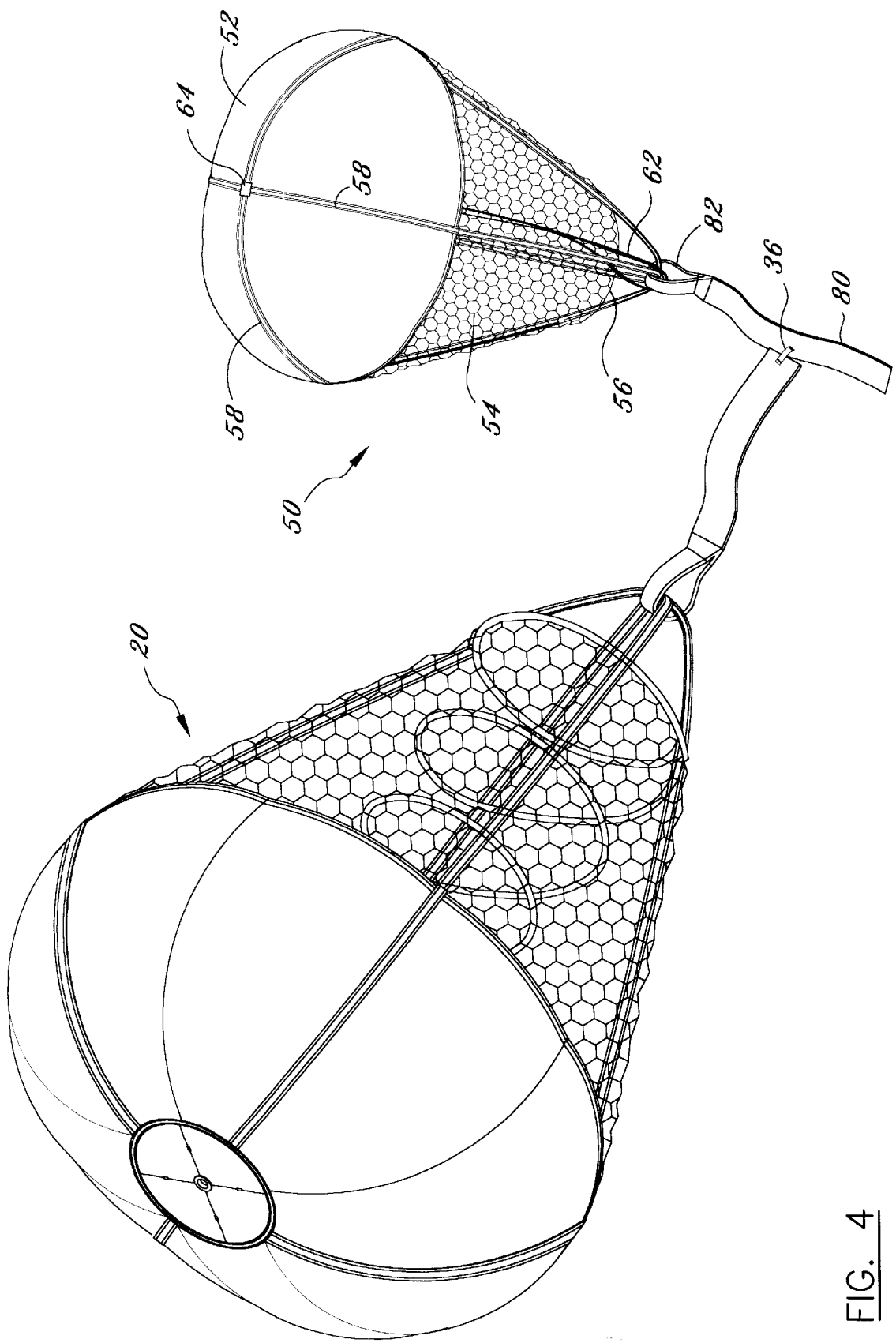
FIG. 4 is a perspective view of a second embodiment of the present invention illustrating the low-speed/high-drag pilot chute and the high-speed/low-drag pilot deployed.

As seen in FIGS. 1 and 2, lines 30 extend beyond fabric pocket 26 and travel through a loop 32 and are attached at similar second locations on chute 20. In the preferred embodiment, loop 32 is defined at closed first end of a pouch 34. Pouch 34 also includes a second end having an opening 35. Pouch 34 is attached at its second end to a bridle cord 80 by a weak link 36. In the preferred embodiment, weak link 36 is one or more relatively small pieces of material with a desired breaking strength, attached at their first end to pouch 34 and at their second end to bridle cord 80. In one embodiment, the weak link can be constructed from a fabric material, though such is not limiting, and other materials can be used and are considered within the scope of the invention. Preferably, weak link 36 is attached by stitching, though other conventional methods are possible and considered within the scope of the invention.

Pouch 34 defines a storage area 38 where high speed/low drag pilot chute 50 is stored when not in use. Pilot chute 50 resembles pilot chute 20 generally in look, but is relatively smaller in size. Pilot chute 50 includes gores 52 and a mesh fabric body 54 attached to the lower end of gores 52 by conventional means such as stitching. A lower end of mesh fabric body 54 are attached to a fabric pocket 56. Suspension lines 58 run from a top center of gores 52 terminating in a fabric end member 60 and are conventionally attached to gores 52, mesh fabric body 54 and fabric pocket 56, by conventional means, including, but not limited to, stitching.

A center line member 62 runs through the center of chute 50 and is attached at a top end to a fabric crown 64 by conventional means such as stitching. Suspension lines 58 and center line member 62 extend beyond fabric pocket 56 and travel through a loop 82 and are attached at similar second locations on chute 50. Loop 82 is defined at a first end of bridle cord 80. The second end (not shown) of bridle cord 80 is conventionally attached to a conventional bag or sleeve which holds the stowed parachute or canopy prior to deployment.

Prior to deployment, the parachute and corresponding lines are stowed on or in the bag or sleeve in such a way that the lines must be fully extended before the parachute or canopy comes out of the bag. The bag and its contents are packed into a conventional container worn by the user.

In use, pilot chute assembly 10 can be deployed manually or by the action of a conventional spring built into the pilot chute itself. The container is opened in this initial deployment process. Initially, only low speed/high drag pilot chute 20 is deployed. However, pilot chute 20 detaches itself (by the breaking of weak link 36 from bridle cord 80) if the drag exceeds a predetermined value.

Upon detachment pouch 34 remains attached to pilot chute 20. However, as high speed/low drag pilot chute 50 remains attached to bridle cord 80 it is withdrawn from its packed position within pouch 34, causing pilot chute 50 to deploy. Pilot chute 50 takes over and allows safe deployment of the parachute or canopy at a higher speed than would otherwise have been possible with pilot chute 20. As such, the present invention allows lowdrag pilot chute 50 to remain packed in pouch 34 and deployed automatically only when needed. Thus, a parachute or canopy, using pilot chute assembly 10 as its deployment device, can be safely used at a wider speed range than was possible before.

Accordingly, in a low-speed deployment, high-drag pilot chute 20 provides enough drag to deploy the parachute or canopy quickly, and low-drag pilot chute 50 remains stowed within pouch 34. However, where the deployment speed is high enough, the force from high-drag pilot chute 20 exceeds the strength of weak link 36 causing its attachment to bridle cord 80 to break. This separates high-drag pilot chute 20, with pouch 34 attached, from the rest of pilot chute assembly 10, causing low-drag pilot chute 50 to deploy. Low-drag/high-speed pilot chute 50 then continues deploying the parachute or canopy, effectively protecting the parachute and its cargo from the ill effects of having too much pilot chute force.

With either pilot chute 20 or 50, drag is created from the airflow, which in turn lifts the bag or sleeve out of the container, extending the lines in the process. Once the lines are extended, the bag or sleeve is opened and the parachute or canopy is released into the airflow and inflates.

With the present invention, there is no need to compromise in the drag characteristics of the pilot chute because the system selects the correct pilot chute for the airspeed the parachute or canopy is being deployed at.

In an alternative embodiment, pouch 34 is eliminated and suspension lines 28 of high drag pilot chute 20 are attached with a weak link directly to bridle cord 80. Low drag pilot chute 50 can be attached to bridle cord 80 similar to that described in the first embodiment. In this alternative embodiment, the deployment of pilot chute assembly 10, causes low drag pilot chute 50 to be deployed in conjunction with high-drag pilot chute 20, Thus, pilot chute 50 assisting pilot chute 20 in low-speed situations. Where the deployment speed is high enough, the force from highdrag pilot chute 20 exceeds the strength of the weak link causing its attachment to bridle cord 80 to break, and leaving only pilot chute 50 to deploy the parachute or canopy.

The various components of the present invention can be constructed from materials and fabric known in the art.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A parachute deployment device, comprising:
    a bridle cord;
    a first pilot chute attached to said bridle cord;
    a second pilot chute attached to said bridle cord; and
    means for detaching said first pilot chute from said bridle cord at a certain deployment speed.

2. The parachute deployment device of claim 1 wherein the detachment of said first pilot chute from said bridle cord causes said second pilot chute to deploy.

3. A parachute or canopy deployment device, comprising:
    a bridle cord;
    a first pilot chute attached to said bridle cord; and
    a second pilot chute attached to said bridle cord;
    wherein said first pilot chute is attached to said bridle cord by a weak link, said weak link adapted to be broken at a certain. deployment speed.

4. The parachute deployment device of claim 3 furthering including a pouch, said pouch having a first end and a second end; wherein said first pilot chute is attached to the first end of said pouch and said weak link associated with the second end of said pouch.

5. The parachute deployment device of claim 4 wherein said pouch having an opening at its second end and defining a storage area, said second pilot chute packed within said storage area prior to deployment.

6. The parachute deployment device of claim 1 wherein said first pilot chute is a low speed/high drag pilot chute.

7. The parachute deployment device of claim 1 wherein said second pilot chute is a high speed/low drag pilot chute.

8. The parachute deployment device of claim 6 wherein said second pilot chute is a high speed/low drag pilot chute.

9. A deployment device adapted for use in both high and low speed parachute deployments, comprising:

a bridle cord;

a high drag pilot chute attached to said bridle cord;

a low drag pilot chute attached to said bridle cord;

means for detaching said high drag pilot chute from said bridle cord at a certain deployment speed.

10. The parachute deployment device of claim 9 wherein the detachment of said high drag pilot chute from said bridle cord causes said low drag pilot chute to deploy.

11. The parachute deployment device of claim 9 wherein said means for detaching is a weak link adapted to be broken at a certain deployment speed.

12. The parachute deployment device of claim 11 furthering including a pouch, said pouch having a first end and a second end; wherein said high drag pilot chute is attached to the first end of said pouch and said weak link associated with the second end of said pouch.

13. The parachute deployment device of claim 12 wherein said pouch having an opening at its second end and defining a storage area, said low drag pilot chute packed within said storage area prior to deployment.

14. A deployment device adapted for use in both high and low speed parachute deployments, comprising:

a bridle cord;

a pouch attached to said bridle cord by a weak link, said weak link adapted to be broken at a certain deployment speed to allow for detachment of said pouch from said bridle cord;

a high drag pilot chute attached to said pouch;

a low drag pilot chute attached to said bridle cord;

wherein the detachment of said pouch from said bridle cord causes said low drag pilot chute to deploy.

15. The deployment device of claim 14 wherein said pouch having an opening at its second end and defining a storage area, said low drag pilot chute packed within said storage area prior to deployment.

* * * * *